United States Patent Office 3,432,528
Patented Mar. 11, 1969

3,432,528
7α-METHYL-19-NOR-ANDROSTADIENES
Georg Anner, Basel, and Peter Wieland, Oberwil, Basel, Switzerland, assignors to Ciba Corporation, New York, N.Y., a corporation of Delaware
No Drawing. Filed July 22, 1966, Ser. No. 567,065
Claims priority, application Switzerland, July 30, 1965, 10,790/65; Sept. 10, 1965, 12,624/65; June 27, 1966, 9,278/66
U.S. Cl. 260—397.3   10 Claims
Int. Cl. C07c 169/10, 169/12, 173/00

ABSTRACT OF THE DISCLOSURE

Compounds of the formula

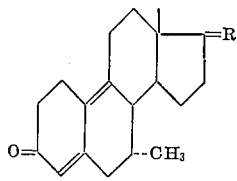

in which R represents an oxo group, a free or an esterified or etherified hydroxyl group in β-position, together with a hydrogen atom or together with a saturated or unsaturated, substituted or unsubstituted lower aliphatic hydrocarbon radical. The compounds show androgenic and anabolic, antigonadotropic and gestagenic action and are also useful as intermediates.

---

The object of the present invention is the preparation of new 7α-methyl-$\Delta^{4,9}$-19-nor-androstadienes of the following formula

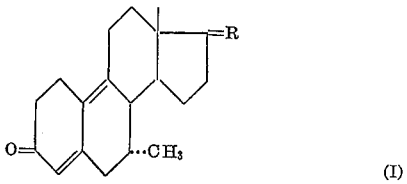
(I)

in which formula R represents an oxo group, a free or an esterified or etherified hydroxyl group in β-position together with a hydrogen atom or together with a saturated or unsaturated substituted or unsubstituted lower aliphatic hydrocarbon radical.

By functionally modified hydroxyl group is meant, in particular, an esterified or etherified hydroxyl group and, by functionally modified oxo group is meant, in particular, a ketalized oxo group. The esterified hydroxyl groups primarily considered are those that are derived from organic carboxylic acids of the aliphatic, alicyclic, aromatic or heterocyclic series, especially those having 1 to 15 carbon atoms, for example, those derived from formic acid, acetic acid, propionic acid, butyric acids, valeric acids, for example, n-valeric acid, trimethyl acetic acid, caproic acids, for example, β-trimethyl-propionic acid or diethylacetic acid, oenanthic, caprylic, pelargonic, capric and undecanoic acids, for example, undecylenic acid, lauric, myristic, palmitic or stearic acids, for example, oleic acid, cyclopropane carboxylic acid, cyclobutane carboxylic acid, cyclopentane carboxylic acid and cyclohexane carboxylic acid, cyclopropylmethane carboxylic acid, cyclobutylmethane carboxylic acid, cyclopentylmethane carboxylic acid, cyclohexylethane carboxylic acid, cyclopentyl-, cyclohexyl- or phenylacetic or propionic acids, benzoic acid, phenoxylalkanoic acids, for example, phenoxyacetic acid, parachloro-phenoxyacetic acid, 2,4-dichloro-phenoxyacetic acid, 4-tertiary-butyl-phenoxyacetic acid, 3-phenoxypropionic acid, 4-phenoxybutyric acid, furan-2-carboxylic acid, 5-tertiary-butyl-furan-2-carboxylic acid, 5-bromo-furan-2-carboxylic acid, nicotinic or isonicotinic acid.

There also come into consideration lower aliphatic and monocyclic aromatic sulfonic acids, such as methane, ethane-, benzene or p-toluene sulfonic acid and moreover inorganic acids, for instance sulfuric acid, hydrohalic acids and especially also phosphoric acids, e.g., ortho- or meta-phosphoric acid.

Ether groups of which particular mention should be made are those derived from lower aliphatic alkanols, for example, ethyl alcohol, methyl alcohol, propyl alcohol, isopropyl alcohol, butyl or amyl alcohols, from araliphatic alcohols, especially monocyclic aryl lower aliphatic alcohols, for example, benzyl alcohol, or from heterocyclic alcohols, especially tetrahydropyranol. Of the ketalized oxo groups, special mention should be made of the lower alkylenedioxy groups. There also come into consideration enol ether groups.

The lower aliphatic hydrocarbon radical which may be present in 17α-position preferably has from 1 to 4 carbon atoms and is thus for instance an alkyl, alkenyl or alkinyl group, e.g., the methyl-, ethyl-, propyl-, vinyl-, allyl-, methallyl-, ethinyl-, propinyl-, trifluoropropinyl- or trichloropropinyl group.

The new compounds display valuable pharmacological properties and/or they are intermediates for the preparation of substances with such properties. Thus they show for instance a strong androgenic and anabolic, antigonadotropic and gestagenic action. The gestagenic and antigonadotropic action is especially pronounced in compounds of the above formula, in which R represents a hydroxy group in β-position together with an unsaturated aliphatic hydrocarbon radical, such as an unsubstituted or substituted ethinyl or propinyl group. There are especially to be mentioned the $\Delta^{4,9}$-3-oxo-7α-methyl-17β-hydroxy-19-nor-androstadiene and its esters, in particular those derived from lower aliphatic carboxylic acids, for instance acetates, trimethylacetates, propionates, valerates, butyrates, but also from aralipatic carboxylic acids such as phenylpropionic acids or some higher aliphatic acids, such as capric acid, undecanoic acid, undecylenic acid, the $\Delta^{4,9}$-3-oxo-7α,17α-dimethyl-17β-hydroxy-19-nor-androstadiene, the $\Delta^{4,9}$-3-oxo-7α-methyl-17α-ethinyl-17β-hydroxy-19-nor-androstadiene and their esters, for instance those just mentioned.

The above said $\Delta^{4,9}$-3-oxo-7α,17α-dimethyl-17β-hydroxy-19-nor-androstadiene possesses high anabolic properties. It stimulates growth of the levator ani muscle in castrate adult male rats in doses as low as 0.005 to 0.01 mg./kg. administered subcutaneously daily for two weeks. Under the same conditions, growth of the seminal vesicles taken as a parameter for androgenic effects is stimulated in doses of 0.2 mg./kg. The $\Delta^{4,9}$-3-oxo-7α-methyl-17α-ethinyl-17β-hydroxy - 19 - nor - androstadiene possesses extremely high antiovulatory properties. Administered daily for four days to normal female rats, treatment beginning on the day of diestrus, this compound in a dose of 0.01 mg./kg. orally completely inhibits spontaneous ovulation. The compound also possesses marked progestational properties. Administered orally to estrogen-sensitized castrate female rabbits in doses from 0.1 mg. to 0.3 mg./kg. for 5 days it induces complete secretory transformation of the endometrium, which is taken as a parameter of its progesterone-like activity.

The compounds of the present invention can be prepared according to methods known per se.

In a preferred method for the preparation of the new compounds of the above Formula I, in a compound of Formula I in which R represents a free or a protected oxo group, a protected oxo group is liberated in known manner and/or a free oxo group is selectively reduced in known manner to a hydroxy group, if desired with the simultaneous introduction of a lower aliphatic hydrocarbon radical in 17α-position, and, if desired, a hydroxy group is esterified or etherified in known manner or in a compound of Formula I in which R represents a free or an esterified or an etherified hydroxyl group, an esterified or etherified hydroxyl group is liberated in known manner and/or if desired, a free hydroxyl group is esterified or etherified or dehydrogenated to the oxo group in known manner.

The reduction of a 17-oxo group to a 17-hydroxy group is conveniently performed with the aid of a complex light metal hydride, such as sodium-boron hydride or lithium aluminum hydride in an ether such as tetrahydrofuran. If the said hydrocarbon radical is to be introduced simultaneously in 17α-position, there is used an organo metal salt of the corresponding hydrocarbon, such as a Grignard compound, for instance methyl magnesium bromide or an alkali metal compound of an unsaturated aliphatic hydrocarbon, such as sodium acetylide. The 3-oxo-group should be protected before carrying out the reduction, for instance by converting it into the oxime. According to a special feature of this process the 17-oxo group is converted by treatment with hydrogen cyanide or one of its derivatives in a manner known per se into the cyanhydrin group, the compound so obtained is reacted with hydroxylamine or one of its lower alkyl derivatives, the Δ$^{4,9}$-7α-methyl-3-oximino-17α-cyano-17β-hydroxy-19-nor-androstadiene is saponified in known manner to the Δ$^{4,9}$-7α-methyl-3-oximino-17-oxo-19-nor-androstadiene, this compound is reacted with the aliphatic organo-metal compound, e.g., with a Grignard compound, such as methyl magnesium bromide, and the 3-oximino group is saponified in a manner known per se by treatment with dilute aqueous acid, especially with pyruvic acid.

The esterification or etherificaton of a 17β-hydroxy-group is carried out in a manner known per se; the compounds to be esterified are thus treated with reactive functional derivatives of acids, such as the halides or anhydrides, in particular those of the above mentioned acids, in the presence of tertiary bases, such as pyridine or quinoline, or with reactive functional derivatives of alcohols respectively, such as alkyl halides or alkyl sulfates, especially those of the above mentioned alcohols, in the presence of basic agents.

According to another aspect of the process of the present invention esterified or etherified hydroxyl groups are liberated in a manner known per se. In order to set free esterified hydroxyl groups the compounds are subjected to alkaline saponification, whereby it is advisable to operate under mild conditions, e.g., in an atmosphere of nitrogen and with the addition of mild reducing agents, such as hydroquinone.

A protected oxo group is especially a ketalized oxo group, e.g., an ethylenedioxy group. Such groups may be saponified with an acid agent, such as 90% acetic acid to give the free oxo groups.

Another way of carrying out the reactions just described with the substituent in 17-position is as follows: the said starting materials, in which R is a free or an esterified hydroxyl group, are ketalized in 3-position or they are converted into a 3-enol-ether or a 3-enamine, whereby there are obtained compounds of the following formulae

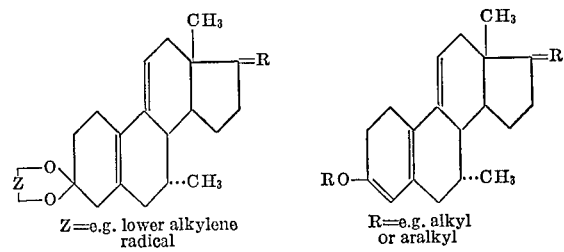

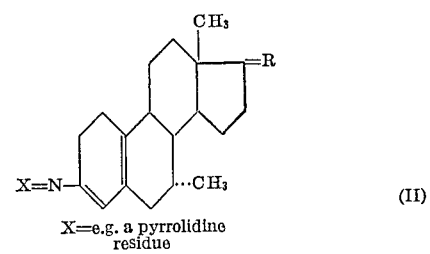

(II)

After having effected the desired conversion in 17-position, e.g., the liberation of an esterified hydroxyl group, oxydation of such a hydroxyl group according to Openauer's method to an oxo group, or introduction, e.g., of an ethinyl or chloroethinyl radical in 17α-position, in a manner known per se, the obtained ketals, enol ethers or enamines are hydrolysed under acidic conditions with the formation of the desired Δ$^{4,9}$-3-oxo-7α-methyl191-nor-androstadienes.

According to another known method a compound of the formula

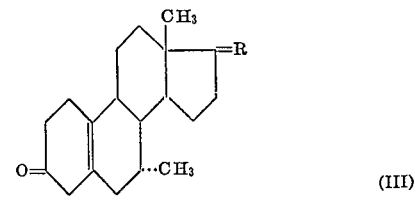

(III)

in which formula R is an oxo group, a free, an esterified or an etherified hydroxyl group in β-position together with a hydrogen atom or together with a saturated or unsaturated substituted or unsubstituted lower aliphatic hydrocarbon radical, is treated with a brominating agent, and hydrobromic acid is split off in the 5,10-dibromo-steroid thus obtained with an agent capable of splitting off hydrobromic acid.

The bromination is preferably carried out in an inert solvent at low temperature, e.g., at 0°. There is either used free bromine, or perbromides, such as phenyltrimethyl-ammonium perbromide. As solvents there are used especially chlorinated aliphatic hydrocarbons such as methylene chloride, chloroform, carbon-tetrachloride, and also tertiary organic bases, such as pyridine, if desired in mixture with the aforementioned solvents.

As an agent capable of splitting off hydrobromic acid there are used especially tertiary organic bases, such as pyridine, the picolines, ethyl pyridine, collidine etc. The reaction is carried out preferably at room temperature. In the case of compounds which have a further isolated double bond, for instance such of the above formula in which R represents a hydroxyl group together with an unsaturated hydrocarbon radical, such as a vinyl group, an addition of bromine at the unsaturated hydrocarbon group may take place. It is thus necessary in such cases to regenerate, e.g., the vinyl group in the said addition product by a treatment with sodium iodide in acetone.

The new compounds of the Formula I may also be obtained from compounds of the formula

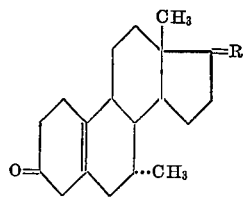

(IV)

in which formula R is an oxo group, a free, an esterified or an etherified hydroxyl group together with a hydrogen atom or together with a lower aliphatic hydrocarbon radical by treatment with an enzyme of an 11-hydroxylating microorganism, dehydration of the resulting 11-hydroxy-compounds to obtain compounds of the formula

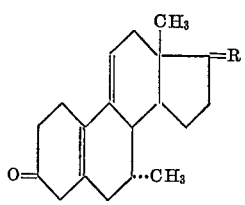

(V)

and treatment of the latter with a mineral acid. As an 11-hydroxylating microorganism there is used for instance *Aspergillus ochraceus, Aspergillus niger, Mucor mucedo, Rhizopus arrhizus, Rhizopus nigricans, Curvularia lunata* or *Streptomyces fradiae*. For the dehydration in 11-position there are used for instance phosphorus halides, especially phosphorus oxychloride, if desired, in the presence of pyridine. Alternatively an 11-hydroxyl group may also be esterified with a sulfonic acid and the ester group split off by treatment with the alkali salt of a lower aliphatic carboxylic acid. For the conversion of compounds of the Formula V into the desired $\Delta^{4,9}$-19-nor-androstadienes a mineral acid is used, e.g., hydrochloric acid.

The starting compounds to be used in these processes may be prepared in the following manner starting from the known 7α-methyl-estrone or 7α-methyl estradiol or their derivatives:

The compounds of Formula I may also be prepared from $\Delta^{9(11)}$-dehydro-7α-methyl-estradiol and its derivatives having a lower aliphatic hydrocarbon radical in 17α-position or from $\Delta^{9,11}$-dehydro-7α-methyl-estrone, and from their esterified or etherified derivatives according to the following scheme of partial formulae The process thus consists in treating a compound of the formula

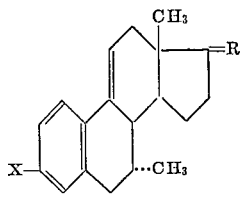

(VI)

in which formula R has the meaning given above, but may also be a protected oxo group, especially a ketalized oxo group, and X is a protected hydroxyl group, for instance an esterified hydroxy group, with an organic peracid, reducing the 9,11-epoxide obtained according to Birch, dehydrating the compound thus obtained and hydrolysing the dehydration product with an acid. An etherified hydroxy group is in particular a lower aralkoxy group or a lower alkoxy group, e.g., a 3-benzyloxy group or a 3-ethoxy group. As organic peracids there are used e.g., peracetic acid, performic acid, perbenzoic acid or perphthalic acid. The reduction according to Birch is carried out in the usual manner with lithium or sodium in liquid ammonia in the presence of a lower aliphatic alcohol such as n-butanol or ethanol. The 11-hydroxyl group is also split off in a manner known per se, e.g., with the aid of phosphorus oxychloride in the presence of pyridine.

The acid hydrolysis is best performed with aqueous hydrochloric acid.

The 7α-methyl-9(11)-dehydro-estrone or estradiol derivatives used as starting materials in this process may be prepared from the corresponding steroids saturated in 9,11-position by treatment with chlorosuccinimide and treatment of the 7-methyl-3-oxo-10-chloroΔ$^{1,4}$-19-nor-androstadienes, e.g., with calcium carbonate in dimethyl formamide.

The present invention also relates to the manufacture of pharmaceutical preparations for use in human or veterinary medicine which contain the new substances described above viz. the 7α-methylΔ$^{4,9}$-19-nor-androstadienes of Formula I as the active ingredients. The excipients used are organic or inorganic excipients suitable for enteral, for example, oral, parenteral or local administration. Suitable excipients are substances that do not react with the new compounds, for example, water, gelatine, lactose, starch, magnesium stearate, talcum, vegetable oils, benzyl alcohols, gums, polyalkyleneglycols, white petroleum jelly, cholesterol and other known medicinal excipients. The pharmaceutical preparations may be, for example, tablets, dragees or capsules, or in liquid form as solutions, suspensions or emulsions, or they may be in the form of ointments or creams. The preparations may be sterilized and/or contain assistants such as preserving, stabilizing, wetting or emulsifying agents, salts for regulating the osmotic pressure or buffers. They may further contain other therapeutically valuable substances. The new compounds can also be used as starting materials in the manufacture of other valuable compounds.

The following examples illustrate the invention.

EXAMPLE 1

2 grams of lithium-aluminum hydride are added to a solution of 18.75 grams of the methyl ether of 7α-methyl-oestrone in 180 ml. of tetrahydrofuran at —16° C. while stirring and in a current of nitrogen. 45 minutes later a mixture of 20 ml. of ethyl acetate and 20 ml. of toluene is added, followed by 400 ml. of semisaturated Seignette salt solution. Extraction is then carried out three times with toluene and the organic solutions are washed several times with semisaturated Seignette salt solution. The organic solutions are dried and evaporated in vacuo and the residue is crystallized from a mixture of methylene chloride, ether and methanol. The crystalline product is dried at 75° C. in a high vacuum. 17.4 grams of 3-methoxy-7α-methyl-17β-hydroxy-Δ$^{1,3,5(10)}$-oestratriene are obtained. After recrystallization the product melts at 129 to 131° C. A further 680 mg. of the same compound can be obtained from the mother liquor.

A solution of 17.4 grams of 3-methoxy-7α-methyl-17β-hydroxy-Δ$^{1,3,5(10)}$-oestratriene in 210 ml. of tetrahydrofuran and 210 ml. of tertiary-butanol is added to 540 ml. of liquid ammonia while stirring and rinsing with a mixture of 30 ml. of tetrahydrofuran and 30 ml. of tertiary butanol. 30 grams of sodium in the form of small lumps are then added at an internal temperature of —70 to —60° C. After stirring for 4¾ hours at the given temperature, 200 ml. of methanol are cautiously added, during which process the temperature rises to —40° C. ¾ hour later, the cooling means is removed and the temperature rises to —29° C. As soon as all the ammonia has evaporated and sodium is no longer present, 450 ml. of water are cautiously added, followed by 450 ml. of saturated sodium chloride solution. After extracting three times with toluene, the organic solutions are washed with semisaturated sodium chloride solution, dried, and evaporated in vacuo. The residue is crystallized from a mixture of ether and pentane. 16.2 grams of 3-methoxy-7α-methyl-17β-hydroxy-Δ$^{2,5(10)}$-19-nor-androstadiene melting at 115 to 116° C. are obtained. A further 0.8 gram of the same compound is obtainable from the mother liquor.

A solution of 13.8 grams of oxalic acid dihydrate in 180 ml. of water is added to a solution of 15 grams of 3-methoxy-7α-methyl - 17β - hydroxy - Δ$^{2,5(10)}$ - 19 - nor-androstadiene in 900 ml. of methanol. After 40 minutes the batch is discharged on to water and extracted three times with toluene. The organic solutions are washed successfully with sodium bicarbonate solution and water, dried, and evaporated in vacuo. The residue consists of 3-oxo-7α-methyl-17β-hydroxy - Δ$^{5(10)}$ - 19 - nor - androstene, which melts at 130 to 131.5° C. after recrystallization from a mixture of methylene chloride, ether and pentane. The product so obtained is bromiated in known manner in a pyridine solution, in which process 3-oxo-7α-methyl-17β-hydroxy-Δ$^{4,9}$-19-nor-androstadiene melting at 166 to 169° C. is obtained.

EXAMPLE 2

14.8 milliliters of a 1.11 N solution of bromine in carbon tetrachloride are added to a solution of 2.42 grams of 3-oxo-7α,17α-dimethyl-17β-hydroxy-Δ$^{5(10)}$-19-nor-androstene in 70 ml. of pyridine in the course of 15 minutes while stirring and cooling with ice; rinsing is then effected with 5 ml. of pyridine. The batch is allowed to stand for 4 hours at room temperature, whereupon it is poured on to 200 ml. of semisaturated sodium bicarbonate solution and extracted three times with methylene chloride. The organic solutions are washed with dilute sodium thiosulfate solution and water, dried, and then evaporated in vacuo at 30° C., and the residue is chromatographed on 120 grams of silica gel. The fractions eluted with a 19:1 mixture of toluene and ethyl acetate are crystalized from a mixture of methylene chloride/ether and 415 mg. of starting material are recovered. 3-oxo-7α,17α-dimethyl-17β-hydroxy-Δ$^{4,9}$-nor-androstadiene is eluted with a 9:1 mixture of toluene and ethyl acetate and is crystallized from a mixture of methylene chloride, ether and petroleum ether; (yield 1.16 grams). The crystals obtained melt at 174.5 to 176.5° C. after a second recrystallization. The ultraviolet spectrum of the compound dissolved in fine spirit shows a maximum at 308 mμ (ε=20000).

The starting material may be obtained as follows:

3.4 grams of 3-methoxy-7α-methyl-17-oxo-Δ$^{2,5(10)}$-19-nor-androstadiene are added to 35 ml. of a 3 N solution of methyl-magnesium chloride in ether while stirring and in a current of nitrogen; this is followed by rinsing with 35 ml. of ether. The batch is stirred overnight at room temperature, ammonium chloride solution is added with cooling, and extraction is effected with methylene chloride.

The organic solution is washed, dried and evaporated in vacuo, and the residue is chromatographed on 100 grams of alumina (activity level II). The first fractions eluted with a 1:1 mixture of toulene and petroleum ether are crystallized from a mixture of ether and pentane, 410 mg. of starting material being obtained. The subsequent fractions contain 3-methoxy-7α,17α-dimethyl-17β-hydroxy-Δ$^{2:5(10)}$-19-nor-androstadiene which melts at 107 to 108° C. after crystallization from a mixture of ether and pentane. The crude carbinol is dissolved in 260 ml. of methanol, a solution of 4 grams of oxalic acid dihydrate in 52 ml. of water is added and the batch is allowed to stand for 40 minutes at room temperature. It is diluted with water, extracted with toluene, the organic solutions are washed with dilute sodium bicarbonate solution and water, dried, and evaporated in vacuo. The residue is crystallized from a mixture of methylene chloride and ether. 2.36 grams of 3-oxo-7α,17α-dimethyl-17β-hydroxy - Δ$^{5(10)}$ - 19 - nor-androstene are obtained which melts at 136.5 to 138° C. after recrystallization.

EXAMPLE 3

490 milligrams of 3 - oxo - 7α-methyl-17α-ethinyl-17β-hydroxy-Δ$^{4,9}$-19-nor-androstadiene melting at 188 to 191° C. are obtained from 1.9 grams of 3-oxo-7α-methyl-17α-ethinyl-17β-hydroxy-Δ$^{5(10)}$-19-nor-androstene by bromination in pyridine in accordance with the process indicated in Example 2 and subsequent chromatography on silica gel. The melting point is raised to 190.5 to 193° C. by crystallization from a mixture of methylene chloride and ether.

The starting material may be obtained as follows:

2.4 grams of lithium acetylide-ethylenediamine are added to a solution of 2.5 grams of 3-methoxy-7α-methyl-17-oxo-Δ$^{2:5(10)}$-19-nor-androstadiene in 35 ml. of dimethylsulphoxide and 6 ml. of toluene in a current of nitrogen and while stirring, rinsing being effected with 6 ml. of toluene. The batch is stirred for 20 hours at room temperature and then 10 grams of ammonium chloride are added followed by water. Extraction is carried out three times with methylene chloride, the organic solutions are washed with dilute sodium chloride solution, dried, and then evaporated in vacuo. The residue is chromatographed on 75 grams of alumina (Activity level II). The first fractions eluted with toluene are crystallized from a mixture of ether and pentane and 235 mg. of starting material are obtained. The subsequent fractions eluted with toluene and a 19:1 mixture of toluene and ethyl acetate yield 3-methoxy-7α-methyl-17α-ethinyl-17β-hydroxy-Δ$^{2:5(10)}$-19-nor-androstadiene. 1.66 grams of this compound are obtained after recrystallization from a mixture of ether and pentane. After being recrystallized several times it melts at 134.5 to 137.5° C. 1.3 grams of the ethinylcarbinol so obtained are dissolved in 110 ml. of methanol; a solution of 1.22 grams of oxalic acid in 22 ml. of water is then added. 40 minutes later the batch is poured on to 260 ml. of water and extraction is carried out three times with toluene. The organic solutions are washed with sodium bicarbonate solution and water, dried, and evaporated in vacuo. The residue is crystallized from a mixture of methylene chloride, ether and petroleum ether, and 905 mg. of 3-oxo-7α-methyl-17α-ethinyl-17β-hydroxy-Δ$^{5(10)}$-19-nor-androstene melting at 168 to 169° C. are obtained. The infra-red spectrum of the compound dissolved in methylene chloride displays characteristic bands at 2.74μ (hydroxyl), 2.97μ (ethinyl) and 5.81μ (6-ring ketone).

EXAMPLE 4

A mixture of 20 g. of 3-methoxy-7α-methyl-17-oxo-Δ$^{1,3,5(10):9(11)}$-19-nor-androstatetraene, 1.1 liter of benzene, 11 ml. of ethyleneglycol and 440 mg. of p-toluene-sulfonic acid are heated 4 hours at the boil in a recipient fitted with a water separator. 100 ml. of saturated sodium bicarbonate solution is added to the cooled reaction mixture and the aqueous phase is extracted with benzene. The organic solutions are washed with water, dried and evaporated in vacuo. The residue is constituted by 3-methoxy-7α-methyl-17 - ethylenedioxy - Δ$^{1,3,5(10):9(11)}$ - 19 - nor - androstatetraene. (The above mentioned starting material may be obtained in a manner known per se from the corresponding 3-hydroxy derivative by methylation with dimethyl sulfate and sodium hydroxide.)

2.5 g. of commercial 85% grade m-chloroperbenzoic acid are added at 0° to a stirred solution of 3,4 g. of 3-methoxy - 7α - methyl - 17 - ethylenedioxy - Δ$^{1,3,5(10):9(11)}$-19-nor-androstatetraene in 100 ml. of methylene chloride. After a reaction period of 6 hours the mixture is poured on to 200 ml. of 2 n-sodium carbonate solution and the mixture is extracted several times with toluene. The organic solutions are then washed with 2 n-sodium carbonate solution and water and evaporated in vacuo. Upon evaporation of the solvent there is obtained a residue consisting of 3 - methoxy-7α-methyl-9,11-oxido-17-ethylenedioxy-Δ$^{1,3,5(10)}$-19-nor-androstatriene. This product is reduced to 3-methoxy-7α-methyl-11-hydroxy-17 - ethylenedioxy-Δ$^{2,5(10)}$-19-nor-androstadiene by treatment with sodium and liquid ammonia in tetrahydrofuran. 5 ml. of phosphorus oxychloride are added at 0° to a stirred solution of 5 g. of 3-methoxy-7α-methyl - 11 - hydroxy - 17-ethylenedioxy-Δ$^{2,5(10)}$-19-nor-androstadiene in 50 ml. of pyridine. After having allowed the reaction mixture to stand for several hours at room temperature it is poured onto ice and the mixture extracted with toluene. The organic layer is washed with water, dilute hydrochloric acid, dilute sodium carbonate solution and water. The residue which remains upon evaporation of the organic solvent, after having dried the solution, is dissolved in 50 ml. of methanol, 2 ml. of concentrated hydrochloric acid are then added and the solution is warmed up for 15 minutes to 70°. The solution is then diluted with water, and extracted with toluene. The toluene solution is washed with water, dried and evaporated in vacuo. The 3,17-dioxo - 7α - methyl - Δ$^{4,9}$-19-nor-androstadiene is thus obtained.

What is claimed is:
1. A compound of the formula

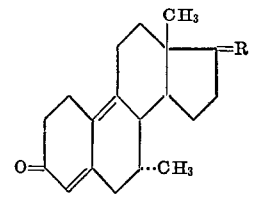

in which formula R is a member selected from the group consisting of an oxo group, a free hydroxy, an esterified and an etherified hydroxy group together with a hydrogen atom and corresponding groups together with a lower aliphatic hydrocarbon radical.

2. A compound as claimed in claim 1, wherein the ester groups are derived from acids selected from the group consisting of aliphatic, alicyclic, aromatic and heterocyclic carboxylic acids having from 1 to 15 carbon atoms, and the ether groups are derived from alcohols selected from the group consisting of lower aliphatic monocyclic lower araliphatic and heterocyclic alcohols.

3. A compound as claimed in claim 1, of the formula

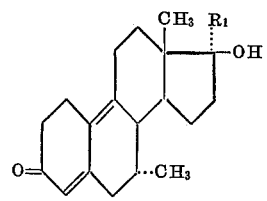

in which R₁ is a member selected from the group consisting of an alkyl, an alkenyl and alkinyl group having from 1 to 4 carbon atoms.

4. A compound as claimed in claim 1 of the formula

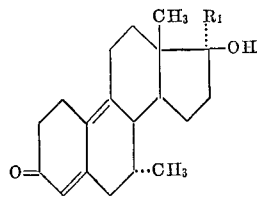

in which $R_1$ is a member selected from the group consisting of a halogenated alkinyl group having from 1 to 4 carbon atoms.

5. A compound as claimed in claim 1 which is the $\Delta^{4,9}$-3-oxo-7α-methyl-17β-hydroxy-19-nor-androstadiene.

6. A compound as claimed in claim 1 which is a lower aliphatic carboxylic acid ester of the $\Delta^{4,9}$-3-oxo-7α-methyl-17β-hydroxy-19-nor-androstadiene.

7. A compound as claimed in claim 1 which is a monocyclic aromatic carboxylic acid ester of the $\Delta^{4,9}$-3-oxo-7α-methyl-17β-hydroxy-19-nor-androstadiene.

8. A compound as claimed in claim 1 which is the $\Delta^{4,9}$-3-oxo-7α,17α-dimethyl-17β-hydroxy - 19 - nor - androstadiene.

9. A compound as claimed in claim 1 which is the $\Delta^{4,9}$-3-oxo-7α-methyl-17α-ethinyl - 17β - hydroxy-19-nor-androstadiene.

10. A compound as claimed in claim 1 which is the $\Delta^{4,9}$-3,17-dioxo-7α-methyl-19-nor-androstadiene.

References Cited

UNITED STATES PATENTS

| | | |
|---|---|---|
| 3,118,919 | 1/1964 | Brown et al. |
| 3,262,949 | 7/1966 | Ringold et al. _ _ _ _ 260—297.3 |
| 3,277,122 | 10/1966 | Alvarez et al. _ _ _ _ _ _ 260—397.3 |

ELBERT L. ROBERTS, *Primary Examiner.*

U.S. Cl. X.R.

260—397.4, 239.5, 239.55, 397.5, 999; 195—51